Jan. 12, 1971  K. M. WOLFF  3,554,595

AUTOMOBILE-CARRIED CAMPER

Filed Oct. 2, 1968  3 Sheets-Sheet 1

INVENTOR.
KEVIN M. WOLFF

BY

*Carl R. Brown*

ATTORNEY

Jan. 12, 1971 K. M. WOLFF 3,554,595

AUTOMOBILE-CARRIED CAMPER

Filed Oct. 2, 1968 3 Sheets-Sheet 2

*INVENTOR.*
KEVIN M. WOLFF

BY

*Carl R. Brown*

ATTORNEY

Jan. 12, 1971  K. M. WOLFF  3,554,595
AUTOMOBILE-CARRIED CAMPER
Filed Oct. 2, 1968  3 Sheets-Sheet 3

*INVENTOR.*
KEVIN M. WOLFF

BY Carl R. Brown

ATTORNEY

United States Patent Office 3,554,595
Patented Jan. 12, 1971

3,554,595
AUTOMOBILE-CARRIED CAMPER
Kevin M. Wolff, 13248 Lindo Lane,
Lakeside, Calif. 92040
Filed Oct. 2, 1968, Ser. No. 764,400
Int. Cl. B62d 33/08
U.S. Cl. 296—26                                    7 Claims

ABSTRACT OF THE DISCLOSURE

A portable camper that is attached directly to an automobile and comprises a box-like shell that slides on runners attached to the top of the automobile and that is moved from a position enclosing the rear portion of the automobile to a position wherein the open end of the shell is adjacent the rear of the automobile and which shell has floor panels that fold down forming the floor and has a fabric covering that extends from the open end of the shell to enclose the space between the sides and top of the automobile and the open end forming an enclosed camper shell.

BACKGROUND OF THE INVENTION

There are many camper units that are known in the art and which generally comprise a cabin unit that is carried on the rear of a pickup truck and has living facilities, such as beds and the like therein. These camper units may be a separate structure from the pickup truck or an integral part of the frame of the truck. However, in either case a truck or like vehicle is required to carry the camper unit thus comprising an expensive combination structure. Other known camper equipments may comprise trailers that have camper facilities therein or expandable structures mounted in relatively small trailers. All of the foregoing structures are relatively expensive, must have their own separate chassis for movement, or must be carried by a particularly adapted vehicle.

It is thus advantageous to have a camper shell that can be carried by an automobile, either a sedan or station wagon, that is easily and quickly mounted on the automobile and that can be slidably moved from a supported position in the automobile to a point adjacent the rear of the automobile to form an enclosed and protected camper shell that can be lived in.

SUMMARY OF THE INVENTION

In an embodiment of this invention, a portable, shell like automobile camper is attached directly to and is supported by an automobile, such as a known sedan or station wagon. The camper is open at one end and has an upwardly, foldable floor that allows the camper shell to be moved in telescoping fashion over the rear of the vehicle on runners secured to a luggage carrier on the top of the automobile. The camper shell is thus directly carried by the vehicle and has a sufficiently light weight that it does not overload the automobile.

In use, the camper shell slides rearwardly on the runners from the first position to a second position, where the open end of the camper shell is adjacent the rear end of the automobile. Legs having rollers, support the rear weight of the camper shell in the second position. The camper shell floor parts in the center and is folded to each side of the wall of the camper shell. A fabric material is positioned between the open end of the camper shell and the top and sides of the automobile for preventing the flow of air into the camper shell during movement of the automobile. In the extended position, the end of the fabric attached to the automobile remains secured to the automobile and the fabric extends to enclose the rear portion of the automobile and the open end of the camper. Thus the rear portion of the automobile can be opened to the volume of the camper structure and utilized therewith. Fender supported brackets coact with bolts on the camper shell for securing the camper shell to the automobile during movement. Additional brackets connect the top of the camper shell to the top of the automobile.

The camper thus forms an enclosed and attached shell to the automobile and is carried by the automobile during travel without requiring permanent modification of the structure of the automobile. The camper shell is easily and quickly moved into a position for use, is lightweight and inexpensive, and yet provides a rigid and serviceable camping shell structure.

It is therefore an object of this invention to provide a new and improved automobile carried camper unit.

It is another object of this invention to provide a new and improved automobile carried camper that is relatively lightweight, is inexpensive, that may be carried anywhere the automobile is capable of going, and that may be quickly and easily moved into operating position.

It is another object of this invention to provide a new and improved automobile carried camper that does not require its own chassis and does not require extensive modifications of an automobile to transport the camper unit.

Other objects and many attended advantages of this invention will become more apparent upon a reading of the following detailed description and an examination of the drawings wherein like reference characters designate like parts throughout and in which.

Figure 1:
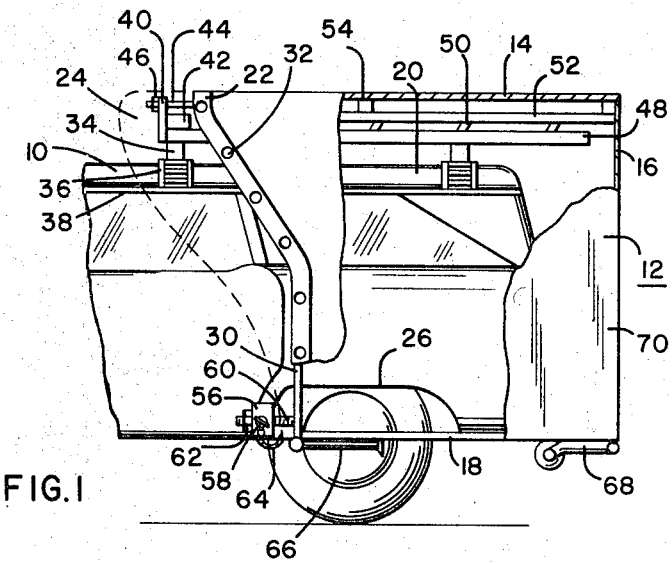
FIG. 1 is a side view with parts broken away of the automobile carried camper positioned on a station wagon automobile.
Figure 12:
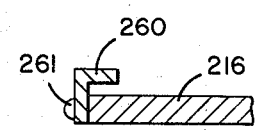
FIG. 12 is a view taken along lines 12—12 of FIG. 10.
Figure 2:
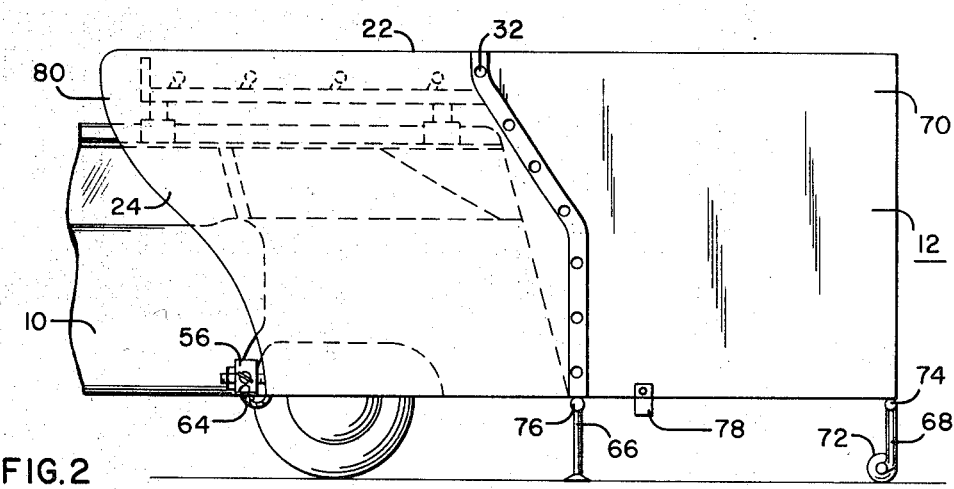
FIG. 2 is a side view with parts broken away of the camper unit of FIG. 1 in the expanded position.
Figure 4:
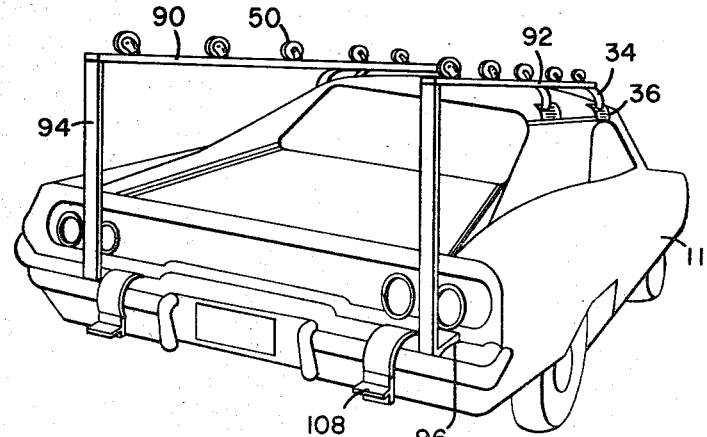
FIG. 4 is an end view in perspective of the mounting of runners on a esdan automobile.
Figure 7:
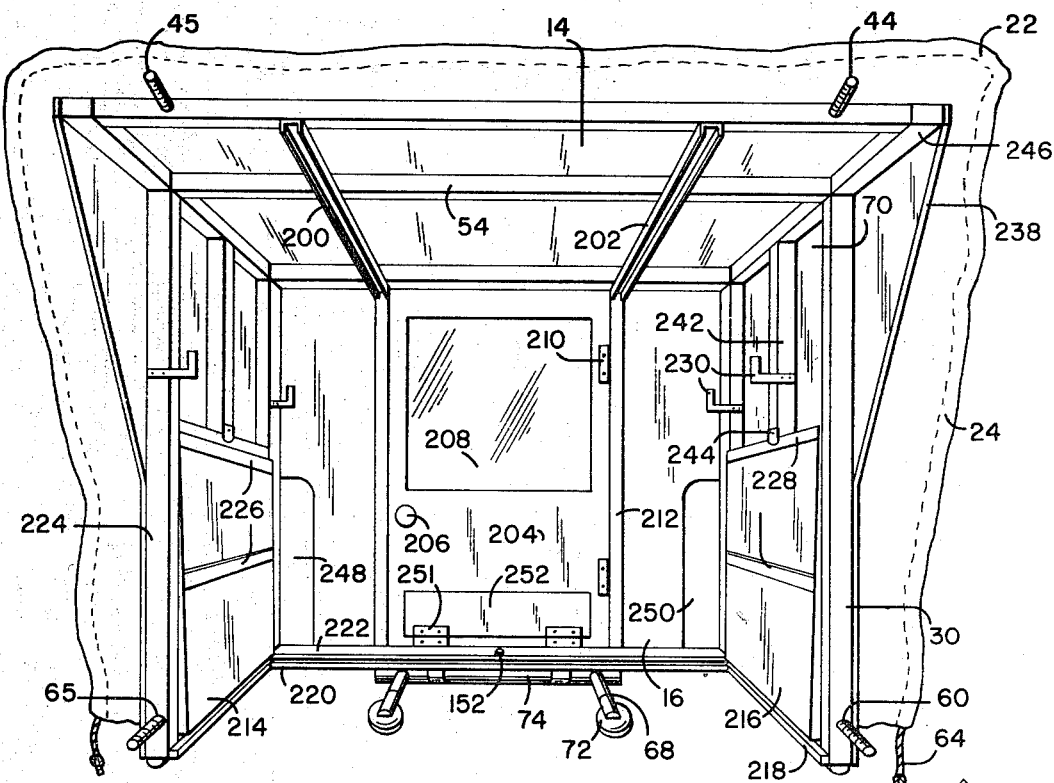
FIG. 7 is an end view of the interior of the camper shell.

Referring now to FIGS. 1, 2, and 7, a camper shell 12 is carried by an automobile 10 that may comprise a station wagon 10, as illustrated in FIG. 1, or a sedan 11, as illustrated in FIG. 4. The camper shell 12 has a top side 14, vertical sides 70, a closed end wall 16 at one end and an open end at the other end. Pivoting floor members 214 and 216 pivot downwardly to form a floor and are retained in an upward pivoted position by known pivoting clasps 244 when the camper is telescoped onto the rear of the automobile.

The camper shell 12 has a frame structure comprising vertical studs 30 and 224, longitudinal beams 246 and cross beams 54. The lower edge of the camper shell has lower longitudinal beams 18 and a lower cross beam 222. The side panels 70 and top panel 14, that may be made of any suitable material such as plywood, are secured in any known manner to the studs and beams. The rear end wall 16 has a door 204 with a known door knob 206 and window 208. The door is supported on a vertical stud 212 by known hinges 210. U-shape beams 200 and 202, that may be made of aluminum or other suitable material, are secured to the cross beams 54 and form longitudinal channels for the runners 48, 49, 90 and 92 that are positioned on the top of the automobile.

Figure 10:
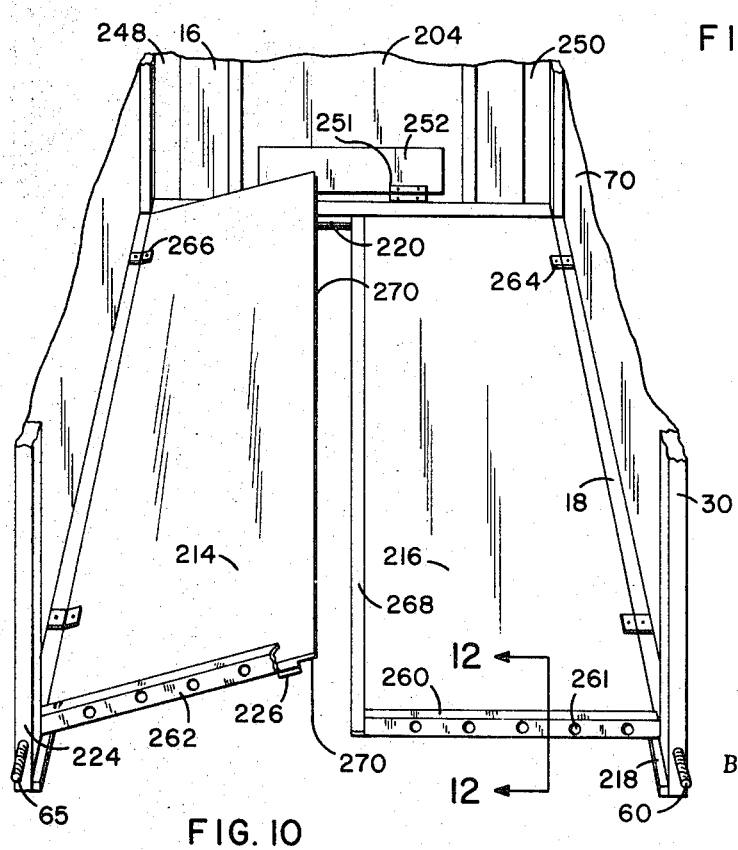
FIG. 10 is an end perspective view with parts broken away illustrating the floor construction of the camper shell.

The floor members 214 and 216, see FIGS. 7 and 10, comprise flat, rectangular plates having metal strengthening strips 226 and 228. The edges of the floor members 214 and 216 adjacent the opening in the camper shell 12, have metal angle members 260 and 262 that are secured by rivets or the like to the panels 214 and 216. The angle members may be made of aluminum or other suitable material and strengthen the ends of the floor panels 214 and 216. The floor panels, at their opposite edges, are secured by known hinges 264 and 266 to the lower beam members 18. The adjacent edges of the floor panels have interlocking shoulders 268 and 270 to provide an abutting fit when the floor panels are in the down position. Side strips 218 and an end strip 220, that may be made of metal or other suitable material, are secured to the sides of the beams 18 and 222 and project into the camper shell space to form a support for the sides and end of the floor panels 214 and 216.

Figure 11:
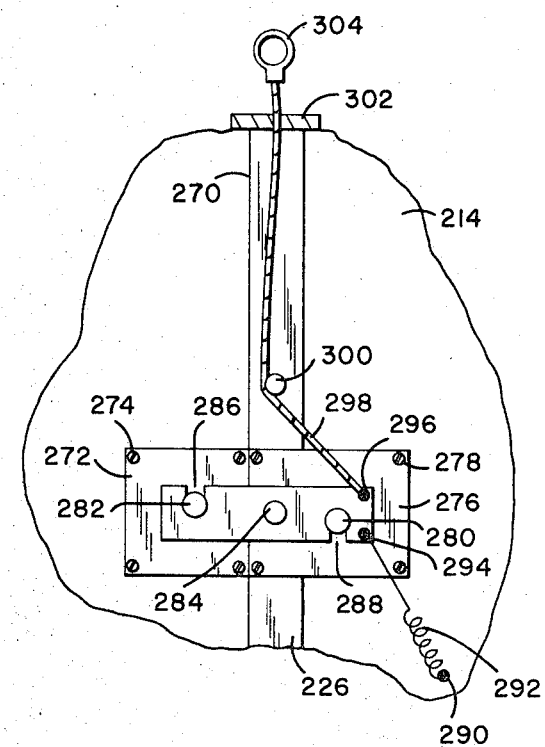
FIG. 11 is a perspective and illustration of a locking latch for locking the floor in the lower abutting position.

In the down position, the floor panels 214 and 216 are latched together by a latch mechanism, see FIG. 11. The latch mechanism comprises a pair of plates 272 and 276 that are secured to the bottom surfaces of the floor panels by screws 278. A pivoting latch plate is supported in a pivoting position on the lower surface of the floor panel 214 by a bolt 284. The latch plate has slots 286 and 288 that coact with the shanks of bolt members 280 and 282 to latch the floor panels together. A cable 298 is secured at 296 to the latch plate and passes around a guide bolt 300. A connecting ring 304 is secured to the cable end projecting through an opening in the end plate 302, that is secured to the lower surface of the floor panel 214. A spring 292 is connected at 294 to the latch plate and at 290 to the floor panel and biases the latch plate to the locked or latched position. It may be understood that by pulling on ring 304, the latch plate is pivoted around the bolt 284 to a position where the latch plate lies adjacent the abutting edge 270 of the floor panels, allowing the floor panels to be pivoted upwardly. When the floor panels are in the down position and upon the release of ring 304, spring 294 pulls the latch plate into the latching position with slots 286 and 298 enclosing the shanks of the bolts 280 and 282.

As additional features of the camper shell 12, the end wall 16 has pivoting panels 248 and 250 that pivot to form an opening. The tail lights of the automobile are visible through the opening in the end wall 16 when the camper shell is mounted in the first position on the vehicle for road travel, as illustrated in FIG. 1. Center panel 252 pivots downwardly on hinges 251 to make visible for license plate of the automobile 10 or 11. The camper shell 12 is also provided with side hook members 230 for supporting cots or other articles for use in living in the camper shell.

Figure 6:
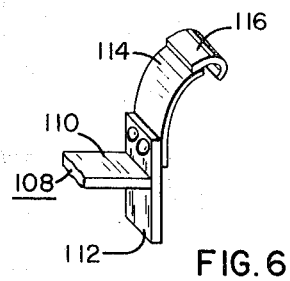
FIG. 6 is a side perspective view of bumper mounts for supporting the rear end of the camper shell.
Figure 3:
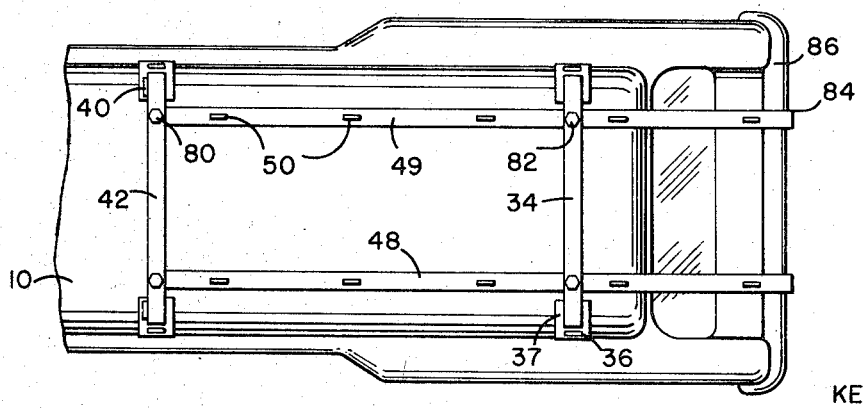
FIG. 3 is a top view with parts broken away of the luggage rack supported runners for carrying the camper shell.

Referring now to FIGS. 1, 3, and 4, a known luggage rack carrier having side connectors 36 mounted on protective pads 37, coact with the side edge 38 of the automobile and secure the cross members 34. The longitudinal runners 48 and 49 are secured to the cross members 34 by known connectors 80 and 82. The runners 48 and 49 have roller wheels 50 secured thereon. The rollers 50 roll on the surface of the channel members 200 and 202 in supporting movement of the camper shell 12 from the first position, as illustrated in FIG. 1, to a second position as illustrated in FIG. 2. The camper shell 12 in its supported position on the rollers 50, moves forward to a position wherein the lower rear edge of the camper shell is lifted slightly upward to rest upon bumper mounts 108, see FIGS. 4 and 6. The bumper mounts 108 comprise a vertical plate 102 secured by a strap 114 to a hook portion 116 that hooks over the top edge of the rear bumper of the automobile. Side plate 110 supports the rear lower edge of the camper shell 12 and defines its forward movement relative to the automobiles 10 and 11. In the forward or first position, threaded studs 44, 45, 60 and 65 coact with connectors connected to the automobile. On the top of the automobile, a cross member 42 is secured to the top edge of the runners 48 and 49 and has secured on the front edge of each side, vertical plates 40 having an aperture therethrough for receiving the ends of studs 44 and 45. Appropriate nuts 46 threadably engage the studs 44 and 45 and secure the top of the camper shell in position.

Figure 9:
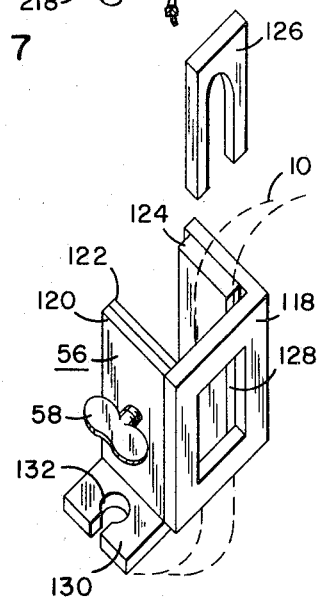
FIG. 9 is a perspective view in partially exploded form of a fender clasp that secures the lower sides of the camper shell to the automobile.

The lower front edge of the sides of the camper shell 12 coact with fender connectors on each side, see FIG. 9. Each fender connector comprises a U-shape member having joined plate members 118 and 120 that fit around the edge of the fender opening of the vehicle 10. Plate 124 abuts against the inner surface of the fender and plate 122 moves with the wing bolt 58 to tighten against insert 126 that in turn abut against the outer surface of the fender. The ends of studs 60 and 65 project through the openings 128 and through the slots in the inserts 126 to secure the camper shell 12 to the fender of the automobile.

A fabric 22 is secured by known fasteners 32 to the sides and top of the camper shell 12. A tie line 64 that extends through a fold over portion of the fabric 22, is used to cinch the forward edge 24 of the fabric, that may be made of canvas material or other suitable flexible fabric material, against the top and sides of the automobiles 10 and 11. Knots in the ends of the line 12 fit through the slotted recess 132 in plate 130 of the fender clasp 56 to hold the end 24 of the fabric in the secured position. The fabric 22 has sufficient length to extend from the secured location to the front edge of the camper shell in the second or extended position. Thus the fabric not only forms a closure for preventing air flow into the shell 12 during operation of the automobile 10 or 11 on the road, but also forms a covering for the open end of the camper shell around the automobile when the camper shell 12 is in the extended or operational position. This allows a portion of the automobile to be contiguous with the open volume of the camper shell 12 and thus provide more room and storage capacity to the entire enclosed area. The fabric 22 as illustrated in FIG. 7, is folded or rolled up in a suitable manner to be easily extended in the manner illustrated in FIG. 2 upon the rearward sliding movement of the camper shell 12.

The camper shell 12 is extended to the second position, as illustrated in FIG. 2, by releasing the stud connectors 44, 45, 60 and 65 and pivoting the wheel unit 68 downwardly to rollably support the end of the camper shell 12. A known pivoting support 6 that pivots on a pivoting connection 76 and is held in the upper position by clasp 78, pivots downwardly upon the extension of camper shell 12 to provide added support for the front end of the camper shell 12.

Figure 8:
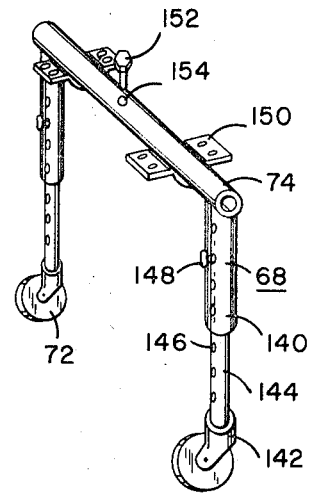
FIG. 8 is a perspective view of the wheel supports for the rear of the camper shell.

The wheel unit 68, see FIG. 8, comprises a tube member 74 that is rotatable in the known U-shaped clasps 150. The clasps 150 are secured to the lower surface of the rear lower beam member 222 and thus allow the tube member 74 to roll in the clasps 150. The tubular and telescoping supports 140 and 144 support the wheels in the known manner. A pin 148 coacts with aligned apertures 146 to hold the wheel unit in the desired extended position. The wheel unit 142, that supports wheel 72, can pivot in the known manner if desired. A lock pin 152 extends through an opening in the beam member 122 and coacts with openings 154 in the pipe member 74 to hold the wheels in either the downwardly projecting position or in the horizontal position as illustrated in FIG. 7.

Figure 5:
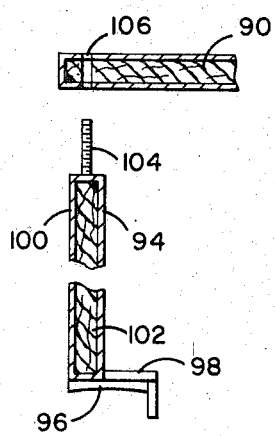
FIG. 5 is a cross-sectional view of a portion of the runner structure that is mounted on a sedan automobile.

In supporting the runners on a sedan automobile, see FIGS. 4 and 5, the forward ends of the runners 90 and 92, having roller units 50 mounted thereon, are supported by the known luggage rack carriers 34 and 36 in the same manner as previously described. The rear ends of the longitudinal members 90 and 92 are supported by vertical support members 94 that have bracket units 96 and 98 secured thereto, and that are shaped to rest in a held position upon the upper surface of the bumper of the vehicle 11. Studs 104 project through openings 106 in each of the respective runners 90 and 92 to secure the two members together. As illustrated, the runners may comprise an inner wood material having a metal outer sheet. However other known constructions can also be used.

In operation, the camper shell 12 is maneuvered into a position wherein the rollers 50 contact the U-shaped beams 200 and 202 and the camper unit is slidably moved on the runners. The lower surface of the rear of the shell is placed on the bumper supports 108 and the bolt members 44, 45, 60 and 65 are fastened to the respective connectors on the automobile. The wheels 68 are pivoted upwardly into retained position and locked by bolt 152. A portion of the flexible material 22 is unfolded and fitted around the top of the automobile forward of the luggage rack, with the ends of ropes 64 secured in openings 132 of the plates 130. The automobile and camper unit is then transported to an appropriate site for camping.

At the camping site, the wheel units 68 are pivoted to a down position and set to the appropriate height. The end bolts are released and the camper unit is slidably moved on the runners to the extended position, as illustrated in FIG. 2. At this time the fabric material 22 is unfolded and the pivoted supports 66 are released and pivoted to the down position. The floors 214 and 216 are then released from clasps 244 and are pivoted to the down position and latched in place. The camper unit is then in a position for camping.

Having described my invention, I now claim:

1. An automobile carried camper comprising,
   a camper shell having a top, sides and a bottom and with one end open and floor members that are pivotally secured to the sides for pivoting upwardly to open the bottom of said shell,
   an automobile having a top, sides and a rear portion,
   runner means secured to the top of the automobile for coacting with the top of said camper and slidably supporting movement of said camper thereon to a first position wherein said shell encloses the rear portion of the automobile and to a second position wherein the open end of said shell is adjacent the rear end of the automobile,
   a flexible fabric secured to said open end of said camper shell and having a free edge for contacting the automobile and closing the open space between the automobile and the ends of said sides and top adjacent said open end of said camper shell,
   first means for releasably securing the sides of said camper shell to the sides of the automobile in said first position,
   and second means for releasably securing said top of said camper shell to the top of the automobile.

2. An automobile carried camper as claimed in claim 1 including,
   the automobile has a rear bumper,
   support means secured to the rear bumper of said automobile for supporting the rear lower edge of said camper shell in said first position.

3. An automobile carried camper as claimed in claim 1 in which,
   said camper has a rear side,
   and the rear side of said camper shell having pivoted openings for viewing of the automobile when said camper shell is in said first position.

4. An automobile carried camper as claimed in claim 1 in which,
   said floor members comprising at least two flat and rectangular plates,
   opposite edges of said plates being pivotally secured adjacent the lower edges of said sides,
   adjacent edges of said plates abutting in the downwardly pivoted position,
   and lock means for locking said adjacent edges together in said abutting position.

5. An automobile carried camper as claimed in claim 1 in which,
   luggage rack means for being releasably secured to the top of the automobile,
   and said runner means comprising a plurality of longitudinal members that are secured to said luggage rack means.

6. An automobile carried camper as claimed in claim 5 in which,
   the automobile has a rear bumper,
   said longitudinal members are spaced from each other and extend parallel with the longitudinal axis of the automobile with the rear ends of the said longitudinal members extending over the rear bumper of the automobile,
   and vertical support members secured at one end to said longitudinal members with the other ends resting on the bumper.

7. An automobile carried camper as claimed in claim 6 in which,
   said longitudinal members having rollers secured to the upper surface and being spaced along the length thereof,
   and the inner surface of the top of said camper shell having longitudinal channel members for receiving said rollers in the movement of said camper shell between said first and second positions.

References Cited
UNITED STATES PATENTS

| | | | |
|---|---|---|---|
| 1,427,749 | 8/1922 | Leech | 296—23 |
| 1,439,277 | 12/1922 | Trout | 296—23 |
| 1,861,906 | 6/1932 | Bradburn | 296—26 |
| 2,127,580 | 8/1938 | Bartholowsky | 296—26 |

PHILIP GOODMAN, Primary Examiner

U.S. Cl. X.R.

52—67